May 9, 1933.   N. A. HALLWOOD   1,908,236
SCALES
Filed Feb. 7, 1930
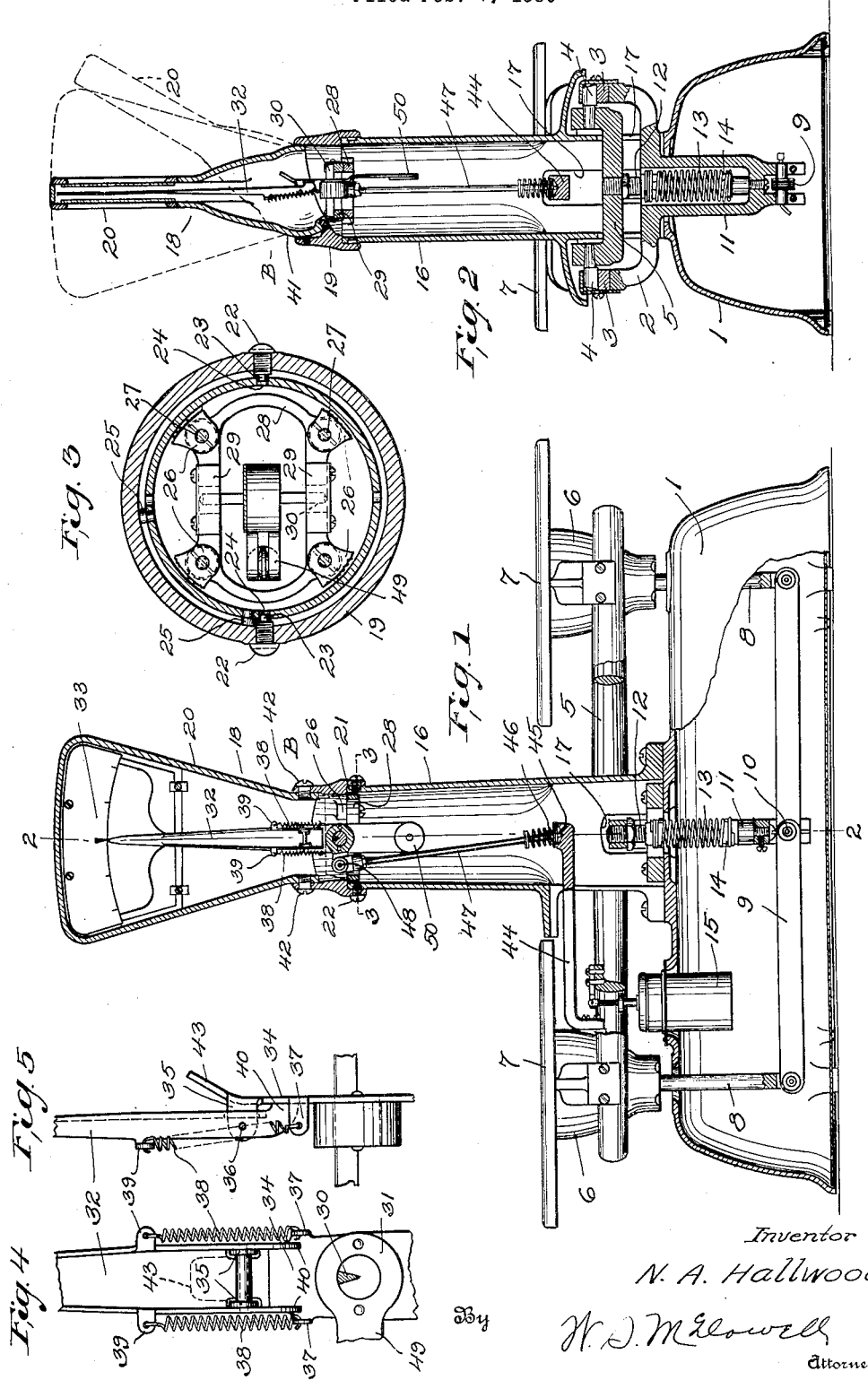
Inventor
N. A. Hallwood
By W. D. McDowell
Attorney Patented May 9, 1933

1,908,236

UNITED STATES PATENT OFFICE

NATHAN A. HALLWOOD, OF COLUMBUS, OHIO

SCALES

Application filed February 7, 1930. Serial No. 426,688.

This invention relates to improvements in weighing scales and has particular application to weighing scales of the so-called "even balance type". Scales of this type are characterized by the provision of a base upon which is mounted intermediately of its ends a beam or lever, and wherein the outer ends of this beam or lever carry pivotally mounted weight receivers, one of which being arranged to receive a known or predetermined weight and the other the commodity to be weighed. In order to facilitate the matter of determining when the beam or lever is in a true state of balance and so that the relationship between the known and determinable weights may be conveniently ascertained, it is customary to provide such scales in the center thereof and between the weight receivers with an upwardly extending tower in which is mounted a pivotal movement indicating mechanism operated by the oscillatory motion of the beam over a graduated surface, whereby when the indicating mechanism assumes a certain definite position in relation to said surface the balance of the beam and the weights carried thereby will be clearly denoted. Usually, the motion of the indicating mechanism is considerably multiplied with respect to the oscillatory motion of the beam so that very slight deviations of the beam from a balanced position may be readily noted by reference to the relationship between the indicator mechanism and its associated graduated scale. Scales of this type are characterized by their ability to permit of ready determinations of known variations in the relative weights of the known and determinable weights.

Heretofore it has been customary to stationarily construct the indicating tower of even balance scales so that said towers assume a definite relationship and fixed plane of position with regard to the weighing beam and weight receivers. Ordinarily, the tower, and the indicating mechanism confined therein, are located in the vertical plane of oscillation of the lever or beam. However, owing to certain commercial conditions it is considered convenient in certain operations that the indicating mechanism should be disposed in a plane transverse to that of the longitudinal axis of the beam, and to provide this construction it has been necessary to re-arrange the construction of the indicating mechanism, and its enclosing tower, to provide for the necessary change. In other words, such a change involves the construction of another type of scale or, as ordinarily known, a different model.

It is a primary object of the present invention to provide in combination with an even balance type of weighing scale an indicating mechanism which may be adjusted so that it may be read either from the front of the scale or from the end thereof without involving any change in the construction of the scale other than the mere adjustment of the indicating mechanism to the desired operating position. By this arrangement the user of the scale adjusts the indicating mechanism to the position which the user considers to be the most advantageous.

It is another object of the invention to construct the tower with an adjustable superstructure in which the under and over scale and the movable indicator are mounted, and wherein provision is made permitting of the rotation of the superstructure about the vertical axis of the stationary or lower portion of the tower without involving any elaboration or modification in the mechanism for imparting motion from the beam to the indicator.

It is a still further object of the invention to permit the superstructure not only to be rotated about the vertical axis of the tower but in addition to be adjusted to assume an angular position with respect to said vertical axis and wherein the indicating mechanism automatically accommodates itself to such changes in position of the superstructure without corresponding change on the part of the motion transmitting means extending to the indicator. The present invention thus provides an arrangement whereby the indicating mechanism possesses a substantially universal mounting which is of such character that the indicating mechanism may be caused to assume several operating positions, most advantageous to the user and one wherein these changes may be made instantly without disturbing the operating mechanism of the scale.

For a further understanding of the invention reference is to be had to the following description and the accompanying drawing, wherein:

Figure 1 is a view in vertical section taken through a scale constructed in accordance with the present invention, Figure 2 is a transverse vertical sectional view on the line 2—2 of Figure 1, Figure 3 is a horizontal sectional view on the line 3—3 of Figure 1, Figure 4 is a detail view on an enlarged scale and in front elevation of the connecting means between the lower end of the indicator pointer and the operating hub of said pointer, and Figure 5 is an edge elevation of the structure disclosed in Figure 4.

Referring more particularly to the drawing, the numeral 1 designates the base of the scale which consists of the usual hollow casing. Carried by the top of the scale is a stirrup 2 in the outer ends of which are mounted transversely spaced bearings 3 for the reception of the knife edge trunnions 4 which project horizontally from a horizontally extending beam or lever 5. This beam carries the trunnions 4 contiguous to its center so that when unweighted it is substantially balanced, as is customary in scales of this character. The outer ends of the beams are pivotally connected with out-riders 6 which support weight receiving platters 7 of customary construction. Depending from the out-riders are stems 8 which terminate within the base 1 and which are pivotally connected with the outer ends of a check rod or link 9, the latter being pivoted intermediate of its ends as at 10 in connection with the lower end of a stem 11 depending from the stirrup 2. To maintain the beam and its associated parts in a balanced or neutral position when unweighted the beam is provided centrally and in registration with the stirrup with a depending stud 12 to which is secured the upper end of a coil spring 13. The lower end of this spring is connected to a boss 14 which is carried by the stem 11. Movement of the beam from a normal position flexes the spring 13 and places the latter under sufficient tension so that when the weights have been removed from the beam the spring will serve to restore the beam to its desired normal position. A dash pot 15 is mounted in the base 1 and has its stem connected with the beam 5 to dampen oscillation of the lever following a weight application to the platters 7.

In order to denote the degree of deflection of the beam from a normal position, the scale includes an indicating mechanism designated generally by the letter B. This mechanism consists of stationary tower 16 which arises centrally from the top of the base 1 between the platters 7, the lower end of the tower being slotted as at 17 to avoid interference with the oscillation of the beam 5. The upper part of the tower is of circular cross-section, as illustrated in Figure 3, and rotatably mounted upon this stationary and circular upper portion of the tower is a super-structure 18 which comprises a collar 19 at its lower end and a substantially triangular casing 20. The collar 19 is annularly shouldered as at 21 to permit of the support of the superstructure on the upper end of the tower 16 and also to permit of the rotation of the superstructure about a vertical axis passing longitudinally through the tower 16. Set screws 22 are carried by the upper end of the tower 16 and are formed with reduced inner ends 23 which may be positioned selectively in pairs of openings 24 formed in the upper circular end of the tower 16. By withdrawing the ends 23 of the screws from the openings 24 the superstructure may rotate until the screws engage with stationary stops 25 carried by the tower, and which stops serve to locate the superstructure in one or the other of its rotatable positions of adjustment.

The collar 19 is provided with inwardly extending lugs 26 to which are secured as at 27 a ring 28. This ring rotates with the collar 19 and carries a pair of spaced fulcrum blocks 29 for the reception of knife edge trunnions 30 which project from the hub 31 of an indicator hand 32, the trunnions providing for the oscillation of the indicator hand. The upper end of the indicator hand 32 is movable relative to an arcuate graduated scale or surface 33 formed in the top of the superstructure 18, the center of the surface being the zero position in registration with which the hand is positioned when the beam 5 is in a normal position.

In this instance the indicator is formed by providing the hub 31 with a vertically extending plate 34 provided with a pair of inturned ears 35 to which the lower end of the indicator hand 32 is pivoted as at 36. Below the ears 35 the plate 34 is provided with lugs 37 with which are engaged the lower ends of springs 38, the upper ends of said springs being connected with laterally directed lugs 39 struck outwardly from the sides of the hand 32. The hand 32 extends below the pivot pin 36 and terminates in inwardly directed stop elements 40, the relationship of the pivot 36 and the springs 38 is such that said springs normally serve to maintain the stop elements in engagement with the plate 34, as shown in figure 5, whereby when in this position the indicator hand oscillates in a vertical plane, as shown in Figures 1 and 2 in full lines.

If desired, the superstructure may be moved to assume an inclined position with respect to the vertical, which is accomplished by forming the lower portions of the casing with a bell-shaped enlargement 41, as indicated in Figure 2, which enlargement is loosely receivable within the enlarged mouth of the collar 19. In addition, the casing 20 is pivotally connected by the horizontally aligned screws 42 with the collar 19 and permits of the swinging of the casing 20 about the horizontal axis afforded by the screws 42. When the casing is being moved to its inclined position, the indicator hand is automatically moved with it and maintained in a proper operating relationship therein. Thus in oscillating the casing 20 laterally the walls of said casing engage with the indicator hand to rock the latter about its pivotal mounting 36 so that the springs 38 will be moved past the pivot to maintain the hand in positive engagement with the inclined upper end 43 of the plate 34, thus keeping the indicator hand centered within the casing 20 and between the side walls thereof in all positions of operation.

To effect the operation of the indicator hand, one of the outriders 6 is formed with an inwardly extending bracket 44, which enters the lower portion of the tower 16. The inner end of the bracket is provided with a socket 45 arranged substantially in the center of the tower 16. Normally engaging with this socket is the spring pressed lower end 46 of a rod 47, the upper end of said rod being pivotally connected as at 48 with a crank extension 49 extending from the hub 31 of the indicator hand. Further, the hub 31 may be provided with a depending weight 50 for the purpose of balancing the upper portion of the indicator hand. The spring at the lower end of the rod 47 is connected to the rod and to the side walls of the socket 45 in such a manner as to maintain the rod in engagement with the socket and to permit of relative movement therewith.

In view of the foregoing, it will be seen that the present invention provides an indicating mechanism for even balance scales which is capable of assuming a variety of selective operating positions which may be desired in meeting the demands for various weight services for the individual peculiarities of the user. First, the indicating mechanism may be positioned, as customary, in a vertical plane in registration with the beam so that the indicating mechanism may be read from the front of the scale. Secondly, the indicating mechanism may be turned from this first position to a perpendicular position wherein it lies substantially at right angles to the plane of oscillation of the beam. In this second operating position convenience in reading the indicator is to be had when the user of the scale applies weights to one of the end platters and is not obliged to change the known weight, as, for example, in weighing or checking packages wherein a certain definite weight is needed. Third, the indicating mechanism may be rocked so that it assumes an angular position with respect to the vertical when in either of its above named positions for the purpose of securing convenience in the reading of the indicating mechanism when the latter is disposed below the eyes of the user. It should be noted that these various positions may be quickly obtained without requiring any adjustment on the part of the operating or motion transmitting means for effecting the operation of the indicating mechanism, other than the mere adjustment of the screws 22. In this respect the rod 47 is located in the axial center of the tower 16 so that while the casing 20 may be rotated about the axis of said tower the lower end of the rod 47 will be constantly maintained in the socket provided therefor in the outer end of the bracket 44. Due to the spring actuated pivotal mounting which the indicator hand has with its hub portion the angular positions of the casing 20 with respect to the vertical may be secured without interference with the motion of the indicator hand, since the latter automatically assumes a position in the center of the casing 20, when in either its vertical or angular positions, by the relationship which exists between the springs 38 and the pivotal point 36. By connecting the bracket 44 with one of the out-riders multiplied motion is imparted to the indicating mechanism to permit of maximum travel of the indicator hand 32 with respect to the graduated surface 33 with but a minimum of movement on the part of the beam from its normal balanced position. In other words, the bracket 44 moves with the outer end of the lever or beam, and this extreme movement is utilized advantageously by connecting the bracket with a short crank arm formed with the hub of the indicator.

While I have described what I consider to be the preferred embodiment of the invention, nevertheless it will be understood that the embodiment illustrated and described has been selected merely as an example of one of the many possible forms which the scale may assume in its commercial development, and I therefore claim as my invention all of such variations or modifications of the scale from the form herein depicted which may be said to fall fairly within the scope and spirit of the following claims.

What is claimed is:

1. In a weighing scale, a vertically arranged indicating tower comprising a stationary lower section and a movable upper section, connecting means between the adjoining portions of the stationary and movable sections of said tower permitting said movable section to assume an angular position with respect to the normal vertical position occupied by the stationary section of said tower, and indicating mechanism arranged in the movable section of said tower.

2. In a weighing scale, a vertically arranged indicating tower comprising a stationary lower section and a movable upper section, connecting means between the adjoining portions of the stationary and movable sections of said tower permitting said movable section to assume an angular position with respect to the normal vertical position occupied by the stationary section of said tower, and self adjusting indicating mechanism arranged in the movable section of said tower.

3. In a weighing scale, a tower structure comprising a stationary lower section and a movable upper section, a collar carried by the lower end of said movable section and rotatably mounted on the upper end of said stationary section, pivotal connecting means between the lower portion of said movable section and said collar permitting of swinging movement of said movable section about a substantially horizontal axis, an indicator movably carried by said movable section, and means disposed in the stationary section for effecting the operation of said indicator throughout all the positions of adjustment of said movable section with respect to the stationary section.

4. In a weighing scale, a vertical tower comprising a stationary lower section and a movable upper section, a mounting between the adjoining ends of the stationary and movable sections permitting of the adjustment of the movable section about vertical and horizontal axes, an indicator carried by said movable section, and operating means for said indicator passing through said stationary tower section and self adjustable to the various operating positions of said indicator.

5. In a weighing scale, a tower structure, an indicator arranged in said tower structure and comprising a hub, a pivotal mounting between said tower structure and said hub, an indicating hand pivotally connected with said hub, spring means arranged between said hand and said hub, and stop devices for limiting the swinging movement of said hand about said pivot in response to the pressures exerted by said spring means.

6. In a weighing scale having a base, a tower structure having a superstructure tiltable with respect to the base of said scale, an indicator arranged in said tower structure and comprising a hub, a pivotal mounting between said tower structure and hub, an indicating hand pivotally connected with said hub, and spring means connecting said hub and hand and functioning to permit the hand to adjust itself to an operable position upon the tilting of said tower structure.

7. In a weighing scale having a base, a tower structure having its upper end tiltable relative to said base, an indicator arranged in the upper section of said tower structure and comprising a hub, a pivotal mounting between the structure and hub, an indicating hand pivotally connected with said hub, and spring means connecting said hand and hub and functioning to permit the hand to adjust itself to an operable position upon the tilting of said tower structure to an angular or vertical position.

In testimony whereof I affix my signature.

NATHAN A. HALLWOOD.